Figure 1:
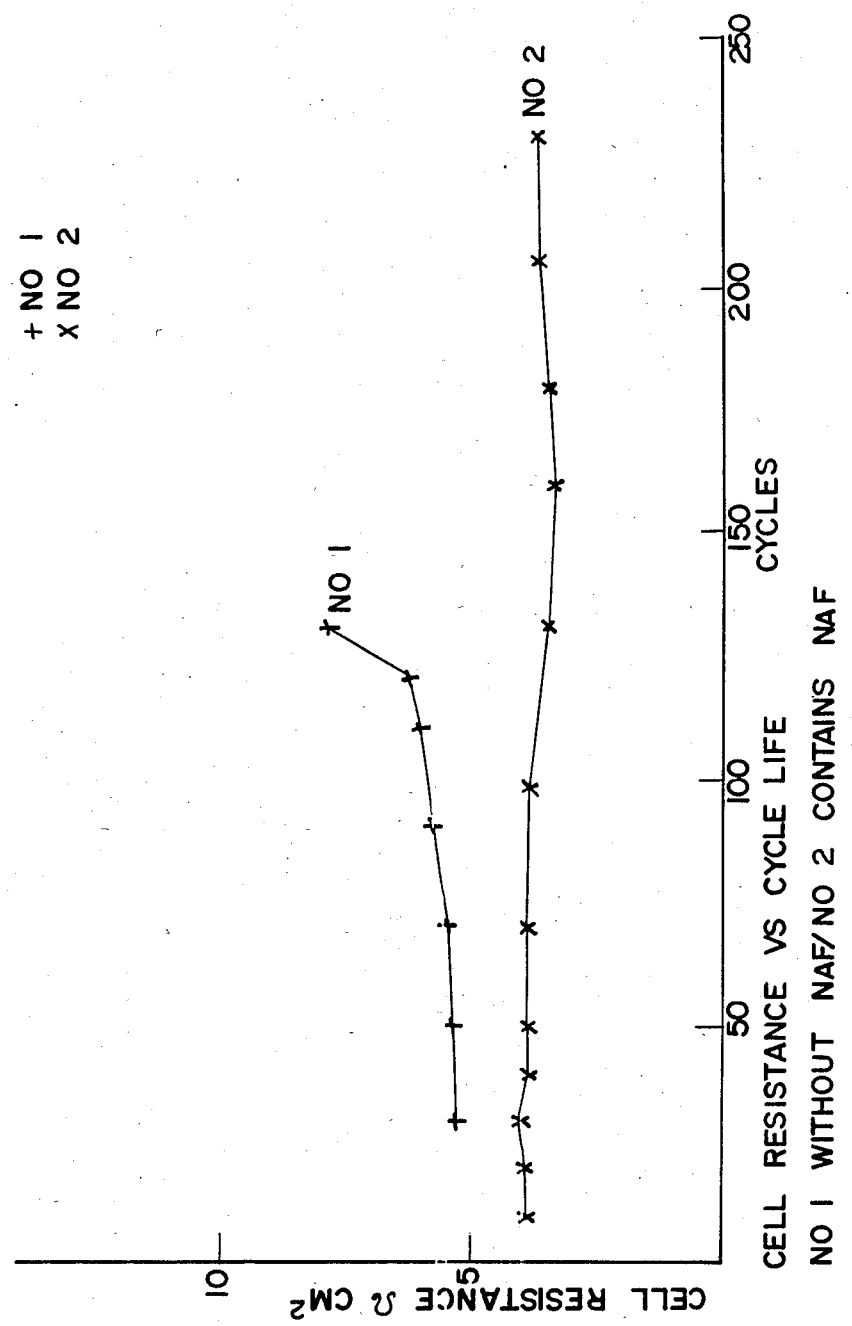

United States Patent [19]

Coetzer et al.

[11] Patent Number: 4,592,969
[45] Date of Patent: Jun. 3, 1986

[54] ELECTROCHEMICAL CELL

[75] Inventors: Johan Coetzer; Margaretha Nolte, both of Pretoria, South Africa

[73] Assignee: Lilliwyte Societe Anonyme, Luxembourg

[21] Appl. No.: 737,442

[22] Filed: May 24, 1985

[30] Foreign Application Priority Data

May 28, 1984 [ZA] South Africa .................... 84/4040

[51] Int. Cl.[4] ........................................... H01M 10/39
[52] U.S. Cl. ..................................... 429/50; 429/112; 429/103
[58] Field of Search .......................... 429/103, 112, 50

[56] References Cited

U.S. PATENT DOCUMENTS 3,877,984  4/1975  Werth .................................. 429/103
3,988,163  10/1976 Sklarchuk ............................ 429/103
4,058,795  4/1985  Mamantov ........................... 429/103
4,287,271  9/1981  Coetzer et al. ...................... 429/103
4,452,777  6/1984  Abraham et al. .................... 429/103

Primary Examiner—Donald L. Walton
Attorney, Agent, or Firm—Arnold, White & Durkee

[57] ABSTRACT

The invention relates to a rechargeable high temperature electrochemical cell having a molten sodium anode, a molten halide salt liquid electrolyte, a compatible cathode in contact with the liquid electrolyte, and a beta-alumina solid electrolyte between the anode and liquid electrolyte and isolating them from each other. The liquid electrolyte is non-acidic and contains sodium cations as its only alkali metal cations, aluminum cations and chloride anions and is doped with fluoride anions to combat progressively increasing internal resistance of the cell associated with cyclic charging and discharging thereof.

15 Claims, 2 Drawing Figures

ELECTROCHEMICAL CELL

This invention relates to an electrochemical cell. In particular the invention relates to a high temperature rechargeable electrochemical cell and to a method of resisting a progressive increase in the internal resistance in an electrochemical cell as it is cyclically charged and discharged.

According to the invention there is provided a rechargeable high temperature electrochemical cell which comprises a sodium anode which is molten at the operating temperature of the cell, a molten halide salt liquid electrolyte which is also molten at the operating temperature of the cell, a compatible cathode which is in contact with the liquid electrolyte and, between the anode and the liquid electrolyte and isolating the anode from the liquid electrolyte, a beta-alumina solid electrolyte, the molten salt electrolyte comprising sodium cations as the only alkali metal cations therein, aluminium cations, chloride anions and fluoride anions, the liquid electrolyte with the cell in its fully charged state being capable of representation as a mixture containing $AlCl_3$, NaCl and NaF in which the molar proportion of $AlCl_3$ is no greater than the molar proportion of sodium halide.

In this specification beta-alumina is used broadly, to include all phases of sodium-ion conducting beta-alumina such as beta"-alumina.

During discharge of the cell, sodium halide is formed at the cathode. This means that, if the abovedescribed constraints for the compositon of the liquid electrolyte are observed, the liquid electrolyte will at no stage of the charge/discharge cycle become on average $AlCl_3$-rich, i.e. the molar proportion of $AlCl_3$ in the liquid electrolyte will never exceed that of the sodium halide. This means that at no stage in the cell cycle should there in principle be any free $AlCl_3$ in the liquid electrolyte.

The proportion of NaF in the liquid electrolyte may be between 2% and 25% on a molar basis, preferably between 10% and 20% on a molar basis, and typically 10-15%.

In one embodiment of the invention the ratio between the $AlCl_3$ and the sodium halide on a molar basis in the liquid electrolyte may be 1:1 when the cell is fully charged, the molar proportion of chloride ions in the liquid electrolyte being grater than the molar proportion of fluoride ions therein.

In another embodiment of the invention the ratio between the $AlCl_3$ and NaCl on a molar basis in the liquid electrolyte may be 1:1 when the cell is fully charged.

The active cathode material in the fully charged cell may be a transition metal halide selected from the group comprising $FeCl_2$, $NiCl_2$, $CoCl_2$, $CrCl_2$, $MnCl_2$ and mixtures thereof. Of these, $FeCl_2$, $NiCl_2$ and mixtures thereof are preferred, particularly $FeCl_2$.

Instead, the active cathode material in the fully charged cell may comprise a chlorinated intermediate refractory hard metal compound, the intermediate refractory hard metal compound being selected from the group comprising the carbides, nitrides, phosphides, borides and silicides, or mixtures thereof, of the group of transition metals comprising iron, nickel, cobalt, chromium, manganese and mixtures thereof. Cathodes of this type, particularly those comprising $FeC_3$ are described in substantial detail in the Applicant's U.S. Pat. No. 4,288,506. Carbides of alloys of iron and nickel have also been found by the Applicant to be effective.

Typically the molten salt electrolyte will be a sodium aluminium chloride electrolyte, doped with a proportion of sodium fluoride, which is less, on a molar basis, than the proportion of sodium chloride in the electrolyte. The Applicant has found that the prime and unexpected advantage of the present invention is that, when compared with the same cell with substantially the same liquid electrolyte, except that the electrolyte is not doped with sodium fluoride, but comprises only sodium aluminium chloride made up of a mixture of $AlCl_3$ and NaCl, e.g. in a 1:1 mole ratio when the cell is fully charged so that it can be expressed as $NaAlCl_4$, there is a substantially reduced rate of increase in the internal resistance of the cell when it is put through a number of charge/discharge cycles.

The invention accordingly extends, in a rechargeable high temperature electrochemical cell comprising a sodium anode which is molten at the operating temperature of the cell, a molten salt liquid electrolyte which is also liquid at the operating temperature of the cell, a compatible cathode which is in contact with the liquid electrolyte and, between the anode and the liquid electrolyte and isolating the anode from the liquid electrolyte, a beta-alumina solid electrolyte, the liquid electrolyte comprising sodium cations as the only alkali metal cations therein, aluminium cations and chloride anions, to the method of resisting a progressive increase in the internal resistance in the cell as it is cyclically charged and discharged, which comprises doping the liquid electrolyte with a proportion of sodium fluoride so that the liquid electrolyte, with the cell in its fully charged condition, can be represented as a mixture containing $AlCl_3$, NaCl and NaF in which the molar proportion of $AlCl_3$ is no greater than the molar proportion of sodium halide.

Without being bound by theory, the Applicant believes that the increase in internal resistance upon being put through a number of charge/discharge cycles sufferred by similar cells containing no sodium fluoride dopant, can arise from the presence in the liquid electrolyte of free or free or excess $AlCl_3$, possibly dissolved therein. Furthermore, when the cathode contains iron, there is a possibility of free or dissolved $FeCl_3$ or $FeCl_2$ in the liquid electrolyte. This free $AlCl_3$, possibly reinforced by species such as free $FeCl_2$ or $FeCl_3$, or possible other analogous transition metal chlorides, can attack the surface of the beta-alumina at the solid electrolyte/liquid electrolyte interface. If these dissolved species are regarded as Lewis acids and the beta-alumina surface is regarded as a Lewis base, reaction between said acids and said base can lead to reaction products which block the free passage of sodium ions through the beta-alumina solid electrolyte surface at the solid electrolyte/liquid electrolyte interface, thereby increasing the cell's internal resistance.

It is believed by the Applicant, without being bound by theory, that the sodium fluoride dopant may reduce the quantity of any free $AlCl_3$ in the liquid electrolyte, and when the cathode contains iron, the sodium fluoride dopant may also suppress the activity of species such as $AlCl_3$, $FeCl_2$ and/or $FeCl_3$ in the liquid electrolyte, either by varying the solubility thereof or by forming highly stable complexes therewith. Such complexes may by their nature have a relatively reduced tendency to poison the beta-alumina surface. It is for this reason that a 1:1 mole ratio between $AlCl_3$ and sodium halide in the liquid electrolyte forms one of the preferred embodiments of the invention, because at this mole ratio the solubility of $FeCl_2$ therein is at a minimum. The Applicant believes that similar considerations may apply when other transition metals such as those mentioned above are present in the cathode.

It is possible that the presence of fluoride ions in the liquid electrolyte may act to reduce the presence of any free $AlCl_3$ or other related acidic species, and of species such as $FeCl_3$ or the like transition metal chlorides, if transition metals are present in the cathode. This may be because the corresponding fluorides of the dissolved species, such as $AlF_3$, $FeF_3$ or the like may be less soluble than the chlorides in the melt and can tend to precipitate out, e.g. as $AlF_3$, $FeF_3$ or the like, or as partially exchanged species such as $AlClF_2$, $FeClF_2$ or the like, which also have reduced solubility compared with the chlorides.

Figure 2:
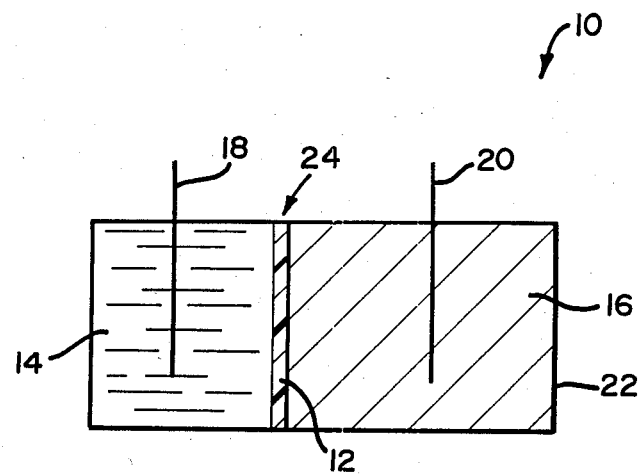

The invention will now be described in more detail with reference to the following illustrative Examples and drawings, in which:

FIG. 1 shows a plot of cell resistance in Ohm $cm^2$ against charge/discharge cycles through which the cells of Example 2 were taken; and FIG. 2 shows schematically a cell according to the invention.

EXAMPLE 1

To test the practicability of the invention, experiments were carried out adding increasing proportions of NaF to equimolar mixtures of NaCl and $AlCl_3$, and the melting points were measured, the results being set out in the following table:

TABLE

| Constituent (Mole %) | | | |
|---|---|---|---|
| $AlCl_3$ | NaCl | NaF | Melting Point (°C.) |
| 50 | 50 | 0 | 156 |
| 45 | 45 | 10 | 155 |
| 40 | 40 | 20 | 154 |
| 35 | 35 | 30 | 154 |

From the above table it appears that doping an equimolar $AlCl_3$/NaCl mixture with NaF causes no unacceptable change in melting point.

EXAMPLE 2

In a comparative experiment, two substantially identical secondary or rechargeable electrochemical high temperature power storage cells were assembled according to the following configurations:
1. Na/beta-alumina/$NaAlCl_4$/$FeCl_2$ (on carbon)
2. Na/beta-alumina/$NaAlX_4$/$FeCl_2$ (on carbon)

In cell No. 2, X comprised $Cl^-$ and $F^-$ anions, the molar ratio of $Cl^-$:$F^-$ being 32:1, the molar ratio of $AlCl_3$:NaCl:NaF in the liquid electrolyte being 8:8:1 (ie expressed in mole % about 47:47:6). In both cells the sodium cations were the only alkali metal cations in the liquid electrolyte.

These two cells were charged and discharged up to about 140 cycles under identical conditions and values for cycle life against internal resistance are shown on the accompanying drawing, which is a plot of internal resistance in Ohm $cm^2$ during discharge against cycle life.

From the point it can be seen that the internal resistance of cell No. 2 in accordance with the invention remained substantially constant over the first 140 cycles, and indeed continued constant up to about 230 cycles. In the case of cell no. 1 (the prior art control) the internal resistance rose progressively so that after about 140 cycles its internal resistance was approaching double that of the cell in accordance with the invention. Furthermore, the cell in accordance with the invention had, at all times, a lower internal resistance than that of the control.

It will be noted with regard to the Table in Example 1 above, that the sodium fluoride was in each case doped or added into a mixture of $AlCl_3$ and NaCl having a 50:50 mole ratio, i.e. so that it can be expressed as $NaAlCl_4$. This procedure was dictated by practical considerations.

Thus, the Applicant has found that, to make a melt consisting of NaCl and $AlCl_3$ which is adequately pure and homogeneous for use as a liquid electrolyte in electrochemical cells of the type in question, the best way of proceeding is to mix $AlCl_3$ and NaCl starting materials together with the NaCl making up slightly more than 50% on a molar basis, and to heat this mixture up to a temperature above 200° C., e.g. in the region of 500° C. There are several reasons for this.

First, it should be noted that, while it is in principle possible to have mixes of $AlCl_3$ and NaCl which are $AlCl_3$-rich, i.e. which contain more than 50 mole % $AlCl_3$, the reverse is not true. At the temperatures in question, say below 500° C., additional NaCl added to a mixture of $AlCl_3$ and NaCl which comprises a 50:50 mole ratio, does not lead to the melt's becoming NaCl-rich, the NaCl merely being insoluble therein. This means that any starting mixture of NaCl and $AlCl_3$ which contains more than 50 mole % NaCl will result in a melt which has a 50:50 mole ratio between $AlCl_3$ and NaCl, the excess NaCl merely existing in solid form as a precipitate or the like which settles out from the melt.

On the other hand, problems arise in forming a melt from a starting material which contains more than 50 mole % $AlCl_3$. The reason for this is that $AlCl_3$ sublimes at about 200° C., and losses of $AlCl_3$ and vapour pressure problems can accordingly arise with $AlCl_3$-rich starting mixtures, unless the melting takes place in an autoclave. The $AlCl_3$-rich melt obtained is furthermore acidic from a Lewis-acid point of view.

It follows that, to make a melt comprising a mixture of $AlCl_3$ and NaCl without employing an autoclave and without any problems which can arise from $AlCl_3$ vapour pressure or acidity, it is easiest and most practical to start with a neutral 50:50 molar mix of $AlCl_3$ and NaCl. Indeed, to ensure that this mix is neutral and that the melt obtained will have the desired 50:50 molar proportions, a slight excess of NaCl is conveniently employed, which will settle out from the supernatant melt.

It should also noted that $AlCl_3$, particularly that which is commerically available for large scale use, typically contains impurities, and can have impurities generated therein by polymerization-type changes to the $AlCl_3$ which can form complexes which in the context of melts for liquid electrolytes in electrochemical cells can be regarded as impurities. A starting mix comprisng $AlCl_3$ containing such impurities and NaCl, with NaCl forming slightly more than half of the mix on a molar basis, is accordingly heated to eg 500° C., to obtain a relatively pure supernatant melt consisting of $AlCl_3$ and NaCl in a 50:50 mole ratio. The excess NaCl and the impurities contained in or formed from the $AlCl_3$ settle out. The relatively pure supernatant melt can then be used for the desired molten electrolyte in an electrochemical cell.

It should be noted, with regard to this melt, that additional NaCl added thereto will be insoluble therein and will merely settle out therefrom, but that additional AlCl$_3$ added thereto will dissolve and will result in AlCl$_3$-rich acidic melt. As mentioned above, following this procedure avoids vapour pressure problems arising from sublimation of AlCl$_3$ in the starting material, and the melt produced is neutral from a Lewis-acid point of view and is accordingly relatively easy to handle. In this regard it is to be noted that the heating, typically to about 500° C., is always to a temperature of above 200° C., so that vapour pressure problems can in principle arise when excess AlCl$_3$ is present.

For the above various reasons, it is accordingly most convenient to dope the NaF in accordance with the invention into a melt which comprises AlCl$_3$ and NaCl in a 50:50 mole ratio. This is the reason why the Table in Example 1 comprises equimolar amounts of AlCl$_3$ and NaCl, into which NaF is doped.

Starting with a 50:50 molar melt of AlCl$_3$ and NaCl, initial doping with NaF results in precipitation of an at least roughly equivalent amount of NaCl on a molar basis, the 50:50 mole ration being maintained, between aluminium halide on the one hand and sodium halide on the other. The volume of the sodium fluoride doped into the melt is approximately equal to the volume of the sodium chloride which precipitates out of the melt, so little volume change takes place in the melt.

As increasing proportions of sodium fluoride are doped into a 50:50 molar AlCl$_3$/NaCl melt, more complex precipitates form and settle out, containing sodium and/or aluminium cations, and chloride and/or fluoride anions. The melt itself maintains its 50:50 ratio on a molar basis between aluminium halide and sodium halide, and it is possible to increase the molar proportion of sodium fluoride in the doped melt up to 20 to 30% on a molar basis or more. Ever-increasing proportions of the starting materials are lost in the precipitate which can be discarded if desired, or if retained in the liquid electrolyte in an electrochemical cell, it can in fact form part of the active cathode material. Thus for example, when a cell is loaded in its discharged state, this can be done by forming an appropriate dry cathode powder mix of iron and sodium chloride and by then saturating this powder mix with molten salt electrolyte. When sodium fluoride doping is employed, the sodium fluoride can form part of the dry power mix, undoped 50:50 molar NaAlCl$_4$ being used to saturate the powder. In this case the sodium fluoride will dissolve in the liquid electrolyte and the precipitate resulting therefrom, which will be predominantly sodium chloride, will form in the saturated powder mix in dispersed form. The sodium chloride in the precipitate, which will be roughly equivalent on a molar basis to the sodium fluoride dopant employed, can then form part of the discharged active iron/sodium chloride mix, the amount of precipitate expected being taken into account in calculating the proportions of iron and sodium chloride in the initial dry powder mix.

Furthermore, as the abovementioned more complex precipitates containing aluminium cations are formed, the volume of precipitate formed starts materially to exceed the volume of sodium fluoride dopant added, so that the volume of melt remaining starts to become appreciably reduced.

While, in principle, any doping of sodium fluoride can reduce the rate of increase in internal resistance of the cell in accordance with the invention, the applicant has found in tests that an effective minimum proportion for the sodium fluoride, to improve cell life, is in the region of 2-3% on a molar basis. As far as the upper limit for doping the sodium fluoride is concerned, an excessive amount of sodium fluoride dopant will, for the above reasons, lead to the precipitation, which can become excessive, of the aforementioned insoluble species.

It is convenient simply to dope the 50:50 molar melt of AlCl$_3$/NaCl with NaF, and to charge the doped melt immediately into the cell. In this way the precipitates can form in the cell, and while in relatively low quantities these precipitates are harmless and amount at most to slight dead weight, excessive quantities of such precipitates can adversely affect the performance of the cell, both from the point of view of excessive dead weight and from the point of vierw of relatively reduced charging and discharging rates obtainable.

From a practical point of view, balancing the various considerations mentioned above, and bearing in mind that excessive proportions of fluoride ions may increase the proportion of high melting point solids in the electrolyte to an unacceptable degree, it appears that the most desirable proportion of sodium fluoride dopant to be added, to provide a liquid electrolyte which can immediately be charged into a cell and will not contain excessive insoluble species, is in the region of 10-15% on a molar basis. In other words, to a 50:50 molar AlCl$_3$/NaCl melt, 10-15% on a molar basis NaF will be added. A roughly equivalent molar amount of NaCl will become insoluble and precipitate therefrom, possibly containing some aluminium cations and fluoride anions, but the doped melt as a whole can be used in the electrochemical cell of the type in question, without the necessity for decanting the supernatant melt for use in the cell.

It should be noted in this regard that, furthermore, following this procedure results in the presence of sodium chloride precipitate in insoluble form in the liquid electrolyte melt in the cell, and this excess NaCl acts as a safety feature, so that when the cell is in its fully charged state there is always some sodium chloride in solid form present, thereby ensuring that the proportion of aluminium chloride in the molten salt electrolyte can never exceed 50% on a molar basis, so that the melt can never become acidic.

It should also be noted that, while there will generally be more chloride anions in the melt than fluoride anions, possible situations can exist in accordance with the invention where the proportion of fluoride anions on a molar basis is greater than that of the chloride anions. Furthermore, depending on other considerations such as the desirability of obtaining a high proportion of fluoride anions in the solution, there may be situations where cations other than sodium and aluminium are present in the liquid electrolyte (although generally alkali metal cations other than sodium will be avoided as these will lower the conductivity of the beta-alumina), and the invention accordingly also contemplates this possibility.

The invention has the desirable effect that it obtains a substantial decrease in the rate at which the internal resistance of the cell rises when put through a substantial number of charge/discharge cycles. Furthermore, doping a sodium aluminium chloride molten salt electrolyte made up of an equimolar mixture of NaCl and AlCl$_3$ with sodium fluoride, while keeping the molar proportion of AlCl$_3$ in the mix no greater than the proportion of sodium halide and indeed no greater than the proportion of NaCl, provides the unexpected feature that there is no unacceptable increase in melting point, at least until the NaF forms more than at least 20%–30% on a molar basis of the mix.

It is known that certain fluoride compounds of the metals in question such as cryolite (Na$_3$AlF$_6$) have a much higher melting point (about 1000° C.) than the corresponding chloride compounds (Na$_3$AlCl$_6$ melts at 150° C.). Similarly AlF$_3$ has a much higher melting point (about 990° C.) than AlCl$_3$. It should thus be expected that the addition of NaF, in the proportions demonstrated in the above table, to an equimolar NaCl/AlCl$_3$ melt, should cause substantial, rapid and unacceptable increase in melting point of the melt. On the contrary, the additions of substantial proportions of NaF were found to be possible without raising the melting point to an unacceptable level, while in no substantial way adversely affecting cell performance while desirably reducing the rate of internal resistance increase, as described above.

Finally, it should be emphasised that it is important that alkali metal cations other than sodium cations eg lithium or potassium cations, are not desirable in the liquid electrolyte, as these alkali metal cations will penetrate the beta-alumina at the beta-alumina/liquid electrolyte interface, leading to a rapid and unacceptable build-up of the internal resistance, and permanent and irreversible deterioration of the cell.

With reference to FIG. 2 of the drawings, test cells 10 were made in accordance with the invention, assembled under an argon atmosphere. In each case, beta alumina solid electrolyte 12 separated a sodium anode 14 from a molten liquid electrolyte, and to ensure good wetting in use of the beta alumina 12 by the molten sodium 14, the beta alumina 12 and sodium 14 were preheated to 400° C. and cooled under argon. The cathode was then placed in position and sufficient molten electrolyte was added under argon, the molten liquid electrolyte comprising in its fully charged state AlCl$_3$, NaCl and NaF in which the molar proportion of AlCl$_3$ was no greater than the molar proportion of sodium halide. The cathode impregnated with electrolyte is shown at 16. The anode 12 and cathode 16 were arranged to have suitable current collectors respectively 18 and 20 in contact therewith, and the beta alumina 12 was arranged so that it formed a continuous barrier 24 between the electrolyte 16 and sodium 14, within a housing 22.

We claim:

1. A rechargeable high temperature electrochemical cell which comprises a sodium anode which is molten at the operating temperature of the cell, a molten halide salt liquid electrolyte which is also molten at the operating temperature of the cell, a compatible cathode which is in contact with the liquid electrolyte and, between the anode and the liquid electrolyte and isolating the anode from the liquid electrolyte, a beta-alumina solid electrolyte, the molten salt electrolyte comprising sodium cations as the only alkali metal cations therein, aluminium cations, chloride anions, and fluoride anions, the liquid electrolyte with the cell in its fully charged state being capable of representation as a mixture containing AlCl$_3$, NaCl and NaF in which the molar proportion of AlCl$_3$ is no greater than the molar proportion of sodium halide.

2. A cell as claimed in claim 1, in which the proportion of NaF in the liquid electrolyte is between 2% and 25% on a molar basis.

3. A cell as claimed in claim 2, in which the proportion of NaF in the liquid electrolyte is between 10% and 20% on a molar basis.

4. A cell as claimed in any one of the preceding claims, in which the ratio between the AlCl$_3$ and the sodium halide on a molar basis in the liquid electrolyte is 1:1 when the cell is fully charged, the molar proportion of chloride ions in the liquid electrolyte being greater than the molar proportion of fluoride ions therein.

5. A cell as claimed in any one of claims 1 to 3 inclusive, in which the ratio between the AlCl$_3$ and NaCl on a molar basis in the liquid electrolyte is 1:1 when the cell is fully charged.

6. A cell as claimed in any one of the preceding claims, in which the active cathode material in the fully charged cell is a transition metal halide selected from the group comprising FeCl$_2$, NiCl$_2$, CoCl$_2$, CrCl$_2$, MnCl$_2$ and mixtures thereof.

7. A cell as claimed in claim 6, in which the active cathode material is selected from the group comprising FeCl$_2$, NiCl$_2$ and mixtures thereof.

8. A cell as claimed in claim 7, in which the active cathode material comprises FeCl$_2$.

9. A cell as claimed in any one of claims 1 to 5 inclusive, in which the active cathode material comprises a chlorinated intermediate refractory hard metal compound, the interemediate refractory hard metal compound being selected from the group comprising the carbides, nitrides, phosphides, borides and silicides, or mixtures thereof, of the group of transition metals comprising iron, nickel, cobalt, chromium, manganese and mixtures thereof.

10. A cell as claimed in claim 9, in which the refractory hard metal compound is selected from the group comprising Fe$_3$C and carbides of alloys of iron and nickel.

11. In a rechargeable high temperature electrochemical cell comprising a sodium anode which is molten at the operating temperature of the cell, a molten salt liquid electrolyte which is also liquid at the operating temperature of the cell, a compatible cathode which is in contact with the liquid electrolyte and, between the anode and the liquid electrolyte and isolating the anode from the liquid electrolyte, a beta-alumina solid electrolyte, the liquid electrolyte comprising sodium cations as the only alkali metal cations therein, aluminium cations and chloride anions, the method of resisting a progressive increase in the internal resistance in the cell as it is cyclically charged and discharged, which comprises doping the liquid electrolyte with a proportion of sodium fluoride so that the liquid electrolyte, with the cell in its fully charged condition, can be represented as a mixture containing AlCl$_3$, NaCl and NaF in which the molar proportion of AlCl$_3$ is no greater than the molar proportion of sodium halide.

12. In a rechargeable high temperature cell comprising a sodium anode which is molten at the operating temperature of the cell, a molten salt liquid electrolyte which is also liquid at the operating temperature of the cell, a compatible cathode in contact with the liquid electrolyte and, between the anode and the liquid electrolyte, a beta-alumina separator, the improvement wherein the liquid electrolyte comprises:

chloride anions, aluminum cations, sodium cations and a sodium fluoride dopant, the molar proportion of $AlCl_3$ being no greater than the proportion of sodium halide with the cell in its fully charged condition.

13. A method of decreasing the rise of internal resistance of an electrochemical cell upon repeated charge/discharge cycles comprising:

providing the cell with a sodium anode molten at the operating temperature of the cell, a cathode disposed for operable contact with an electrolyte which is liquid at the operating temperature of the cell, and a beta-alumina solid separator;

providing an electrolyte in contact with the cathode, the electrolyte comprising an approximately equimolar mixture of NaCl and $AlCl_3$; and doping said electrolyte with sufficient NaF such that at no stage of the charge/discharge cycle does the molar proportion of $AlCl_3$ in the electrolyte exceed the molar proportion of sodium halide to prevent free or excess $AlCl_3$ in the electrolyte and the concurrent, progressive rise in internal resistance of the cell.

14. The method according to claim 13, wherein the proportion of NaF doped in the electrolyte is between about 2% and 25% on a molar basis.

15. The method according to claim 13, wherein said electrolyte before doping comprises a mixture of NaCl and $AlCl_3$ with NaCl making up slightly more than 50% of the mixture on a molar basis.

* * * * *